United States Patent
King et al.

(10) Patent No.: US 9,424,691 B2
(45) Date of Patent: *Aug. 23, 2016

(54) PARKING METER COMMUNICATIONS FOR REMOTE PAYMENT WITH UPDATED DISPLAY

(71) Applicant: IPS Group, Inc., San Diego, CA (US)

(72) Inventors: David William King, Rancho Santa Fe, CA (US); Chad P. Randall, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,691

(22) Filed: Feb. 20, 2014

(65) Prior Publication Data

US 2014/0172518 A1 Jun. 19, 2014

Related U.S. Application Data

(63) Continuation of application No. 12/875,975, filed on Sep. 3, 2010, now Pat. No. 8,749,403.

(60) Provisional application No. 61/240,136, filed on Sep. 4, 2009.

(51) Int. Cl.
*G08G 1/00* (2006.01)
*G08B 23/00* (2006.01)
(Continued)

(52) U.S. Cl.
CPC ............ *G07B 15/02* (2013.01); *G06Q 30/0284* (2013.01); *G07C 1/30* (2013.01); *G07F 17/24* (2013.01)

(58) Field of Classification Search
CPC ....... G07F 17/248; G07F 7/02; G07F 7/0866; G07B 15/02; G07B 15/00; G07B 15/063; B60R 2325/101; B60R 2325/202; B60R 2325/205; B60R 25/24; B60R 25/243; G01S 15/025; G01S 15/101; G01S 15/931; G01S 2015/938; G01S 7/52004; G01S 7/524; G06K 17/0022; G06K 2017/0051; G06K 7/0008; G06Q 20/343; G06Q 20/363; G06Q 30/0284; G07G 1/0045; G07G 1/009; G08G 1/14; G08G 1/202
USPC ......... 340/932.2, 933, 693.12, 309.7, 539.13, 340/693.9, 8.1, 907, 908, 988
See application file for complete search history.

(56) References Cited

U.S. PATENT DOCUMENTS 2,161,046 A 6/1939 Hitzeman
2,822,682 A 2/1958 Sollenberger
(Continued)

FOREIGN PATENT DOCUMENTS

CA 2377010 12/2001
CA 2363915 A1 5/2003
(Continued)

OTHER PUBLICATIONS

U.S. Appl. No. 14/059,260, filed Oct. 21, 2013, King et al.
(Continued)

*Primary Examiner* — Fekadeselassie Girma
(74) *Attorney, Agent, or Firm* — Wilson, Sonsini, Goodrich & Rosati

(57) ABSTRACT

A parking meter receives data indicative of a remote payment being completed and displays an amount of time purchased by the remote payment for a parking session. The parking meter determines an amount of time remaining in the parking session and powers down at least a portion of a meter communication subsystem subsequent to receiving the data indicative of the remote payment being completed. The parking meter wakes up the powered down portion of the communication subsystem upon determining that the amount of time remaining is below a threshold time, and can receive an indication of additional time being paid for remotely, and can update the displayed time remaining to reflect the additional time.

19 Claims, 7 Drawing Sheets

(51) Int. Cl.
*H04B 7/00* (2006.01)
*H04W 24/00* (2009.01)
*G07B 15/02* (2011.01)
*G06Q 30/02* (2012.01)
*G07C 1/30* (2006.01)
*G07F 17/24* (2006.01)

(56) References Cited

U.S. PATENT DOCUMENTS

| | | |
|---|---|---|
| 2,832,506 A | 4/1958 | Hatcher |
| D189,106 S | 10/1960 | George |
| 2,988,191 A | 6/1961 | Grant |
| 3,183,411 A | 5/1965 | Palfi |
| 3,535,870 A | 10/1970 | Harold |
| 3,721,463 A | 3/1973 | Attwood et al. |
| 3,999,372 A | 12/1976 | Welch et al. |
| 4,043,117 A | 8/1977 | Maresca et al. |
| 4,812,805 A | 3/1989 | Lachat et al. |
| 4,823,928 A | 4/1989 | Speas |
| 4,825,425 A | 4/1989 | Turner |
| 4,875,598 A | 10/1989 | Dahl |
| 4,880,097 A | 11/1989 | Speas |
| 4,895,238 A | 1/1990 | Speas |
| 5,065,156 A | 11/1991 | Bernier |
| 5,222,076 A | 6/1993 | Ng et al. |
| 5,244,070 A | 9/1993 | Carmen et al. |
| 5,273,151 A | 12/1993 | Carmen et al. |
| 5,360,095 A | 11/1994 | Speas |
| 5,442,348 A | 8/1995 | Mushell |
| 5,471,139 A | 11/1995 | Zadoff |
| 5,563,491 A | 10/1996 | Tseng |
| 5,614,892 A | 3/1997 | Ward, II et al. |
| 5,617,942 A | 4/1997 | Ward et al. |
| 5,640,002 A * | 6/1997 | Ruppert et al. ......... 235/462.46 |
| 5,642,119 A | 6/1997 | Jacobs |
| 5,648,906 A | 7/1997 | Amirpanahi |
| 5,659,306 A * | 8/1997 | Bahar ................... G07F 17/246 194/902 |
| 5,710,743 A | 1/1998 | Dee et al. |
| 5,737,710 A | 4/1998 | Anthonyson |
| 5,777,951 A | 7/1998 | Mitschele et al. |
| 5,778,067 A | 7/1998 | Jones et al. |
| 5,806,651 A | 9/1998 | Carmen et al. |
| D400,115 S | 10/1998 | Yaron et al. |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A * | 12/1998 | Jacobs et al. ............... 340/932.2 |
| 5,954,182 A | 9/1999 | Wei |
| 6,037,880 A | 3/2000 | Manion |
| 6,078,272 A * | 6/2000 | Jacobs et al. ............... 340/932.2 |
| 6,081,205 A | 6/2000 | Williams |
| 6,111,522 A * | 8/2000 | Hiltz et al. ................. 340/932.2 |
| 6,116,403 A | 9/2000 | Kiehl |
| 6,195,015 B1 * | 2/2001 | Jacobs et al. ............... 340/693.9 |
| D439,591 S | 3/2001 | Reidt et al. |
| 6,229,455 B1 | 5/2001 | Yost et al. |
| 6,230,868 B1 | 5/2001 | Tuxen et al. |
| D447,714 S | 9/2001 | Cappiello |
| D449,010 S | 10/2001 | Petrucelli |
| 6,309,098 B1 | 10/2001 | Wong |
| 6,312,152 B2 | 11/2001 | Dee et al. |
| RE37,531 E * | 1/2002 | Chaco et al. ..................... 379/38 |
| D454,807 S | 3/2002 | Cappiello |
| 6,373,422 B1 | 4/2002 | Mostafa |
| D461,728 S | 8/2002 | Tuxen et al. |
| 6,456,491 B1 | 9/2002 | Flannery et al. |
| D463,749 S | 10/2002 | Petrucelli |
| 6,457,586 B2 | 10/2002 | Yasuda et al. |
| 6,505,774 B1 | 1/2003 | Fulcher et al. |
| 6,697,730 B2 * | 2/2004 | Dickerson ..................... 701/465 |
| 6,747,575 B2 | 6/2004 | Chauvin et al. |
| 6,856,922 B1 | 2/2005 | Austin et al. |
| 6,914,411 B2 | 7/2005 | Couch et al. |
| 6,929,179 B2 | 8/2005 | Fulcher et al. |
| 7,019,420 B2 | 3/2006 | Kogan et al. |
| 7,027,773 B1 | 4/2006 | McMillin |
| 7,029,167 B1 | 4/2006 | Mitschele |
| 7,183,999 B2 | 2/2007 | Matthews et al. |
| 7,222,031 B2 | 5/2007 | Heatley |
| 7,237,716 B2 | 7/2007 | Silberberg |
| 7,388,349 B2 | 6/2008 | Elder et al. |
| D575,168 S | 8/2008 | King et al. |
| D587,141 S | 2/2009 | King et al. |
| 7,748,620 B2 | 7/2010 | Gomez et al. |
| 7,772,720 B2 | 8/2010 | McGee et al. |
| 7,806,248 B2 | 10/2010 | Hunter et al. |
| 7,854,310 B2 | 12/2010 | King et al. |
| 7,855,661 B2 | 12/2010 | Ponert |
| 7,933,841 B2 | 4/2011 | Schmeyer et al. |
| D654,816 S | 2/2012 | Mackay et al. |
| D656,046 S | 3/2012 | Mackay et al. |
| 8,138,950 B1 * | 3/2012 | Leung ................ G06Q 30/0284 235/382 |
| D661,603 S | 6/2012 | Mackay et al. |
| 8,279,107 B2 | 10/2012 | Krstanovic et al. |
| 8,395,532 B2 | 3/2013 | Chauvin et al. |
| 8,479,909 B2 | 7/2013 | King et al. |
| 8,513,832 B2 | 8/2013 | Hunter et al. |
| 8,566,159 B2 | 10/2013 | King et al. |
| D692,784 S | 11/2013 | Anderssen et al. |
| 8,590,687 B2 | 11/2013 | King et al. |
| 8,595,054 B2 | 11/2013 | King et al. |
| 8,631,921 B2 | 1/2014 | Jones et al. |
| 8,684,158 B2 | 4/2014 | Jones et al. |
| D705,090 S | 5/2014 | Mackay et al. |
| D707,140 S | 6/2014 | King et al. |
| D707,141 S | 6/2014 | King et al. |
| D707,142 S | 6/2014 | King et al. |
| 8,749,403 B2 | 6/2014 | King et al. |
| 8,770,371 B2 | 7/2014 | Mackay et al. |
| 8,862,494 B2 | 10/2014 | King et al. |
| D749,000 S | 2/2016 | King et al. |
| D750,513 S | 3/2016 | King et al. |
| 2001/0012241 A1 | 8/2001 | Dee et al. |
| 2001/0047278 A1 | 11/2001 | Brookner et al. |
| 2001/0051531 A1 | 12/2001 | Singhai et al. |
| 2002/0008639 A1 * | 1/2002 | Dee ............................. 340/932.2 |
| 2002/0111768 A1 | 8/2002 | Ghorayeb et al. |
| 2003/0092387 A1 | 5/2003 | Hjelmvik |
| 2003/0112151 A1 | 6/2003 | Chauvin et al. |
| 2003/0112597 A1 | 6/2003 | Smith |
| 2003/0121754 A1 | 7/2003 | King |
| 2003/0128010 A1 | 7/2003 | Hsu |
| 2003/0128136 A1 | 7/2003 | Spier et al. |
| 2003/0132840 A1 | 7/2003 | Bahar |
| 2003/0140531 A1 | 7/2003 | Pippins |
| 2003/0144972 A1 | 7/2003 | Cordery et al. |
| 2003/0169183 A1 * | 9/2003 | Korepanov et al. ........ 340/932.2 |
| 2003/0179107 A1 | 9/2003 | Kibria et al. |
| 2003/0220835 A1 | 11/2003 | Barnes |
| 2003/0222792 A1 | 12/2003 | Berman et al. |
| 2004/0068434 A1 | 4/2004 | Kanekon |
| 2004/0084278 A1 | 5/2004 | Harris et al. |
| 2004/0094619 A1 | 5/2004 | Silberg |
| 2004/0181496 A1 | 9/2004 | Odinotski et al. |
| 2004/0264302 A1 | 12/2004 | Ward |
| 2005/0040951 A1 | 2/2005 | Zalewski et al. |
| 2005/0178639 A1 | 8/2005 | Brumfield et al. |
| 2005/0192911 A1 | 9/2005 | Mattern |
| 2006/0021848 A1 | 2/2006 | Smith |
| 2006/0116972 A1 | 6/2006 | Wong |
| 2006/0149684 A1 | 7/2006 | Matsura et al. |
| 2006/0152349 A1 | 7/2006 | Ratnaker |
| 2006/0267799 A1 | 11/2006 | Mendelson |
| 2007/0016539 A1 | 1/2007 | Groft et al. |
| 2007/0094153 A1 | 4/2007 | Ferrari |
| 2007/0114849 A1 | 5/2007 | Falik et al. |
| 2007/0119682 A1 | 5/2007 | Banks et al. |
| 2007/0136128 A1 | 6/2007 | Janacek et al. |
| 2007/0184852 A1 * | 8/2007 | Johnson et al. ............. 455/456.1 |
| 2007/0210935 A1 | 9/2007 | Yost et al. |

(56) References Cited

U.S. PATENT DOCUMENTS

| | | |
|---|---|---|
| 2007/0285281 A1 | 12/2007 | Welch et al. |
| 2008/0071611 A1* | 3/2008 | Lovett .................... 705/13 |
| 2008/0093454 A1 | 4/2008 | Yamazaki et al. |
| 2008/0147268 A1* | 6/2008 | Fuller .................... 701/35 |
| 2008/0208680 A1 | 8/2008 | Cho |
| 2008/0238715 A1 | 10/2008 | Cheng et al. |
| 2008/0245638 A1 | 10/2008 | King et al. |
| 2009/0026842 A1 | 1/2009 | Hunter et al. |
| 2009/0032368 A1 | 2/2009 | Hunter et al. |
| 2009/0095593 A1 | 4/2009 | King et al. |
| 2009/0109062 A1* | 4/2009 | An .................... G06Q 20/04 340/932.2 |
| 2009/0159674 A1 | 6/2009 | King et al. |
| 2009/0183966 A1 | 7/2009 | King et al. |
| 2009/0192950 A1 | 7/2009 | King et al. |
| 2009/0267732 A1 | 10/2009 | Chauvin et al. |
| 2009/0284907 A1 | 11/2009 | Regimbal et al. |
| 2009/0315720 A1 | 12/2009 | Clement et al. |
| 2010/0106517 A1 | 4/2010 | Kociubinski et al. |
| 2010/0188932 A1* | 7/2010 | Hanks et al. .................. 367/140 |
| 2010/0332394 A1 | 12/2010 | Ioli |
| 2011/0057815 A1 | 3/2011 | King et al. |
| 2011/0060653 A1 | 3/2011 | King et al. |
| 2011/0063133 A1 | 3/2011 | Keller et al. |
| 2011/0203901 A1 | 8/2011 | King et al. |
| 2011/0313822 A1 | 12/2011 | Burdick |
| 2012/0158466 A1 | 6/2012 | John |
| 2012/0222935 A1 | 9/2012 | Mackay et al. |
| 2012/0285790 A1 | 11/2012 | Jones et al. |
| 2012/0285791 A1 | 11/2012 | Jones et al. |
| 2012/0285792 A1 | 11/2012 | Jones et al. |
| 2012/0285793 A1 | 11/2012 | Jones et al. |
| 2013/0005445 A1 | 1/2013 | Walker et al. |
| 2013/0027218 A1 | 1/2013 | Schwarz et al. |
| 2013/0099943 A1 | 4/2013 | Subramanya |
| 2013/0238406 A1 | 9/2013 | King et al. |
| 2013/0285455 A1 | 10/2013 | Hunter et al. |
| 2014/0040028 A1 | 2/2014 | King et al. |
| 2014/0108107 A1 | 4/2014 | Jones et al. |
| 2014/0129158 A1 | 5/2014 | Shea |
| 2014/0174881 A1 | 6/2014 | King et al. |
| 2014/0210646 A1 | 7/2014 | Subramanya |
| 2014/0231505 A1 | 8/2014 | King et al. |
| 2014/0289025 A1 | 9/2014 | King et al. |
| 2015/0084786 A1 | 3/2015 | King et al. |
| 2015/0106172 A1 | 4/2015 | Salama |
| 2015/0235503 A1 | 8/2015 | King et al. |

FOREIGN PATENT DOCUMENTS

| | | |
|---|---|---|
| EP | 0329129 A2 | 8/1989 |
| EP | 0980055 | 2/2000 |
| EP | 1128350 B1 | 10/2007 |
| FR | 2837583 | 9/2003 |
| IL | 149880 A | 6/2007 |
| JP | S5259000 A | 5/1977 |
| JP | S58121494 A | 7/1983 |
| JP | 2002-099640 | 4/2002 |
| JP | 2005-267430 | 9/2005 |
| KR | 10-2005-0038077 | 4/2005 |
| WO | WO-2005-031494 | 4/2005 |
| WO | WO-2006-095352 | 9/2006 |
| WO | WO-2009-154787 | 12/2009 |
| WO | WO-2014014494 A1 | 1/2014 |

OTHER PUBLICATIONS

U.S. Appl. No. 14/260,234, filed Apr. 23, 2014, King et al.

Cell Net Data Systems, "First Wireless Monitoring of Parking Meters Results in Theft Arrests Using CellNet Data Systems Technology," PRNewswire, May 11, 1999, 2 pgs.

Flatley, "In San Francisco, Hackers Park for Free," Read filed under Misc. Gadgets, downloaded from www.engadget.com website on May 3, 2010, originally posted on Jul. 31, 2009, 5 pages.

Howland, S. , "How M2M Maximizes Denver's Revenue," FieldTechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.

Meter Solutions, Single-Space Meters brochure, downloaded from www.duncansolutions.com website, revised Apr. 2006, 2 pages.

PCT/IB2006/054574 International Preliminary Report on Patentability dated Mar. 10, 2009.

PCT/IB2006/054574 International Search Report dated Oct. 27, 2008.

PCT/US2010/047906 International Preliminary Report on Patentability dated Mar. 6, 2012.

PCT/US2010/047906 International Search Report dated Mar. 30, 2011.

PCT/US2010/047907 International Preliminary Report on Patentability dated Mar. 15, 2012.

PCT/US2010/047907 International Search Report dated Apr. 26, 2011.

PCT/US2012/048190 International Search Report dated Jan. 22, 2013.

Co-pending U.S. Appl. No. 14/811,641, filed Jul. 28, 2015.

Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.

Co-pending U.S. Appl. No. 14/979,104, filed Dec. 22, 2015.

Co-pending U.S. Appl. No. 29/520,918, filed Mar. 18, 2015.

Co-pending U.S. Appl. No. 29/521,401, filed Mar. 23, 2015.

Decision Denying Institution of Inter Partes Review dated Mar. 30, 2016 of U.S. Pat. No. 7,854,310. IPR Case No. IPR2016-00068.

Decision Denying Inter Partes Review dated Apr. 1, 2016 of U.S. Pat. No. 8,595,054. IPR Case No. IPR2016-00069.

Decision Denying Inter Partes Review dated Apr. 1, 2016 of U.S. Pat. No. 8,595,054. IPR Case No. IPR2016-00070.

Institution of Inter Partes Review dated Mar. 30, 2016 of U.S. Pat. No. 7,854,310. IPR Case No. IPR2016-00067.

Petition for Inter Partes Review of U.S. Pat. No. 7,854,310. IPR Case No. IPR2016-00067, filed Oct. 22, 2015.

Petition for Inter Partes Review of U.S. Pat. No. 7,854,310. IPR Case No. IPR2016-00068, filed Oct. 22, 2015.

Petition for Inter Partes Review of U.S. Pat. No. 8,595,054. IPR Case No. IPR2016-00069, filed Oct. 22, 2015.

Petition for Inter Partes Review of U.S. Pat. No. 8,595,054. IPR Case No. IPR2016-00070, filed Oct. 22, 2015.

Spyker et al Predicting Capacitor Run Time for a Battery/Capacitor Hybrid Source. Power Electronic Drives and Energy Systems for Industrial Growth. 1998. Proceedings. 1998 International Conference.

Tung. Design of an advanced on-street parking meter. RIT Scholar Works. Thesis/Dissertation Collections (2001).

* cited by examiner

PARKING METER COMMUNICATIONS FOR REMOTE PAYMENT WITH UPDATED DISPLAY

This application is a continuation of U.S. Non-Provisional application Ser. No. 12/875,975, filed Sep. 3, 2010, which claims the benefit of U.S. Provisional Application No. 61/240,136, filed Sep. 4, 2009, entitled "Parking Meter Communications for Remote Payment with Updated Display," each of which is incorporated herein by reference for all purposes.

BACKGROUND

A parking meter is typically associated with a single parking space such that the parking space can be occupied for a predetermined amount of time in accordance with the amount of payment received at the meter. Expiration of the amount of time at the meter exposes the vehicle occupying the parking space to a fine. Advances in meter technology have generally not been propagated for managing parking meter enforcement and parking meter fee payment. Enforcement of parking meter fees is still largely performed by an individual manually traveling to each parking space and checking the time remaining on the associated parking meter. The individual is generally charged with noting violations of fee payment and issuing citations. This is a time-consuming and costly service. As with many tasks, manual involvement produces inefficiencies and unreliability.

For some systems, it is possible to provide payment to a parking meter via a mobile telephone, also referred to herein as a cell telephone. Such payment systems are typically referred to as pay-by-cell systems. The pay-by-cell technology has evolved in the parking industry as a method for cashless payment, as an alternative to cash-based payment and for when debit card, credit card, or other cashless forms of payment are not readily accessible. This has been especially true in the single space parking meter market. The pay-by-cell technology involves each parking meter unit being turned on (i.e., electrical power is applied) at the time a user initiates a paid parking period (i.e., begins a parking session). When the parking meter is turned on, it can communicate with the local cell telephone infrastructure to complete the payment transaction and start the timing process.

The pay-by-cell technique provides a more convenient cashless payment, and can also have the ability to add additional time to a parking space remotely. For example, if a user of a pay-by-cell parking space is stuck in a meeting and knows that it will be necessary to purchase more time before the meeting ends, then the user can do so by the following process, described in Table 1:

TABLE 1

| Step | Operation |
|---|---|
| 1 | User registers with a parking service provider, providing credit card and associated cell phone information for payment of future parking sessions. |
| 2 | User decides to use pay-by-cell in a designated location. |
| 3 | At the designated location, the user initiates power to the parking meter and places a call to a central database of the parking service provider, while the parking meter communicates with the central database. |
| 4 | The user provides information on parking pole/space location and amount of time to be purchased to the central database. |
| 5 | Time is granted and details regarding the purchase are stored in the central database (service provider hosted). |
| 6 | In response to the user payment, the central database communicates the amount of time purchased to the meter at the designated location. |
| 7 | Some time after initiating the parking session, the user can decide to pay additional amounts to extend the time period for the parking session by communicating with the central database and authorizing payment. However, because the parking meters are not always awake (they power-down to save power), the updated time cannot be communicated from the central database to the meter for display. |
| 8 | Because the meter does not display the time added in Step 7, enforcement requires officers to check with the central database for paid time, prior to issuing a citation, because a meter with a display that indicates the parking session has expired may actually have time remaining, due to the Step 7 payment. This need for checking is cumbersome and time consuming, making enforcement difficult. |

Performing the above pay-by-cell process is time consuming to the user, requiring the user to register, place a call, and note the location and the amount of time to be purchased. In addition, the availability of credit card payment for both multi-space and single-space parking meters is likely to have a negative impact on pay-by-cell use due to the ease and speed of paying with a credit card. Some feel that pay-by-cell is akin to paying with a credit card, but using a cell phone to do so. Again, this is a more time consuming and confusing process than just paying with a credit card directly.

The above pay-by-cell process is also difficult from an enforcement perspective, as it requires enforcement personnel to contact the central database to determine if time has been added to the meter. Enforcement personnel would prefer to determine if a meter/space has time remaining by simply looking for an updated expiration indicator on the meter itself. The need for checking with the central database to determine remaining time, on a meter that otherwise indicates time has expired, translates into a slower enforcement pace and reduces the number of spaces that can be monitored by enforcement officers and reduces the citations issued for expired meters, which also translates into less revenue for a city or parking authority.

Some companies have implemented new technologies to address the primary drawbacks discussed above, with limited success. For example, enforcement personnel can be provided with Web-enabled access to pay-by-cell central databases. However, this still requires additional time and money to perform the checking Meters can be configured to communicate over low-power mesh network wireless systems to enable the meters to always be awake and thereby receive updated data over the mesh network. This allows the meters to keep their displays updated and show the additional purchased time. However, mesh network parking meters are not without problems.

Mesh network parking meter systems require additional infrastructure, including wireless routers installed at various locations throughout the wireless network to act as the focal points of communication. These routers typically require electrical power on a 24/7 (twenty-four hours per day, seven days per week) schedule, and therefore mesh network parking meters are typically installed on street light, traffic signal, or other city utility street poles that can supply power to such units. In more complicated systems, additional router communication units are installed to provide levels of redundancy, and repeaters may also be installed to extend the geographic coverage of the mesh network.

The additional mesh network infrastructure requires installation and maintenance. Installation of the wireless routers is costly, can require permitting, and consumes electricity. This creates any number of issues, depending on which entity owns the poles, the permitting process and added bureaucracy to determine how to pay for the consumed electricity, allocating responsibility for who will maintain the installed router system, and what will be the impact if a router fails.

Mesh network technology can be relatively expensive in terms of material costs, maintenance costs, installation, and permitting costs. While it is possible that other services can be processed through the mesh network, the economics of the service is such that few customers are willing to make such an investment of money and resources to install and maintain mesh network parking systems for such a limited economic return.

Due to the cumbersome steps in current pay-by-cell processes, pay-by-cell payments typically represent less than 5% of all parking revenues for a given city. In areas with a younger demographic, and especially in university settings, pay-by-cell is typically more popular and higher percentages of its use are typical. However, a more streamlined pay-by-cell process, from the perspective of both the users and the enforcement personnel, could result in greater acceptance and more pay-by-cell payments.

SUMMARY

As disclosed herein, a parking meter receives data indicative of a remote payment being completed and displays an amount of time purchased by the remote payment for a parking session. The parking meter determines an amount of time remaining in the parking session and powers down at least a portion of a meter communication subsystem subsequent to receiving the data indicative of the remote payment being completed. The parking meter wakes up the powered down portion of the communication subsystem upon determining that the amount of time remaining is below a threshold time, and can receive an indication of additional time being paid for remotely, and can update the displayed time remaining to reflect the additional time.

Other features and advantages of the present invention should be apparent from the following description of preferred embodiments that illustrate, by way of example, the principles of the invention

BRIEF DESCRIPTION OF THE DRAWINGS

The invention is now described, by way of a non-limiting example, with reference to the accompanying drawings, in which.

Figure 1:
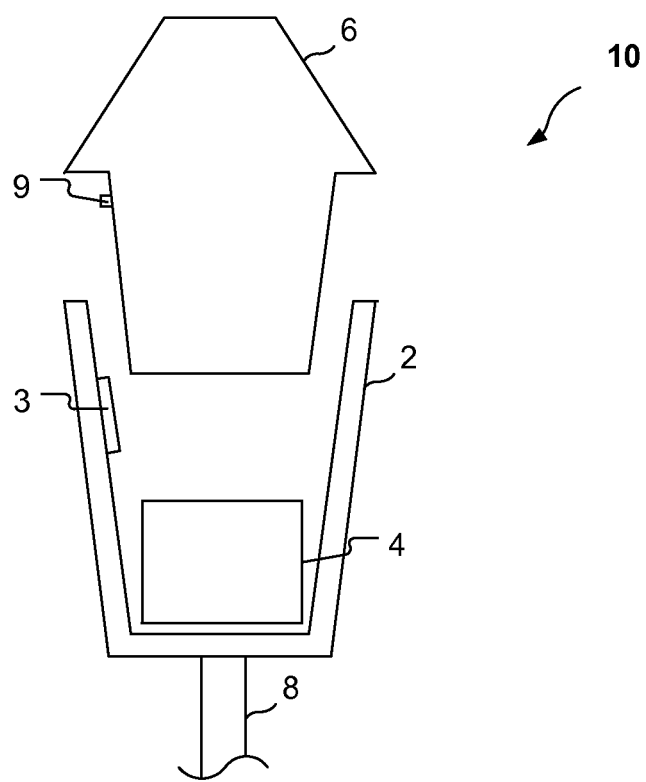
FIG. 1 is a schematic illustration of an embodiment of single space parking meter.

In the appended figures, similar components and/or features may have the same reference label. Further, various components of the same type may be distinguished by following the reference label (e.g. "6") by a dash and a second label that distinguishes among the similar components (e.g. "6-1" and "6-2"). If only the first reference label is used in the specification, the description is applicable to any one of the similar components having the same first reference label irrespective of the second reference label.

DETAILED DESCRIPTION

According to one embodiment of a parking meter as described herein, a management system having a central database communicates with parking meters that are not continuously on, such as in a pay-by-cell configuration, and the parking meters themselves will initiate power on and communication with the management system just prior to expiration of the parking session, to determine if additional time has been purchased. If no additional time has been purchased, the parking meter will let the time for the parking session expire as it normally would and its associated display will show expiration (zero time remaining). If additional time has been purchased, then the management system will provide the new expiration time to the parking meter when the parking meter initiates the communication. The parking meter includes a radio transceiver for communicating with the management system. Operation of the parking meter includes transmitting radio signals to, and receiving radio signals from, the management system. In this way, enforcement personnel are always assured that the display of a parking meter is current and updated to show actual remaining time. It is not necessary for enforcement personnel to check the central database of the management system before issuing a citation for an expired meter. Thus, a more streamlined pay-by-cell process is provided, and both users and enforcement personnel benefit from a more convenient process.

In the disclosed system, paying with a cell phone will not require the user to call into a central call center. Instead, users will register with the management system, at which time they will provide credit card and cell phone information. The registration may be completed via a Web site. After registration, the user will receive some form of registered user identifier for communicating to a parking meter. The user identifier could be in the form of, for example, an identification card, an account number, a credit card, a debit card, a smart card (contact or contactless), a contactless RFID tag or a driver's license. The user identifier creates an association between the registered user's credit card (or any other type of payment account), the ID of the registered user, and the registered user's cell phone number. The user identifier may be carried on the person, or can be placed on a key chain, in a wallet, or affixed to the back of a cell phone. Other arrangements are also acceptable. The user may provide the system with the user identifier and the system will associate the user's registration information with the user identifier.

When a user wishes to pay for a parking session, the user will initiate a payment session. In one embodiment, the user will press a button on the parking meter to activate a RFID tag reader of the parking meter and will present an RFID tag in close proximity to the parking meter. In other embodiments, the user will slide a credit card or debit card into a magnetic card reader of the parking meter. In other embodiments, a smart card (contact or contactless) reader is activated by the user to read a smart card. The parking meter reads the user identifier and communicates the user registration identification information to the management system, which can thereby associate the registered user and credit card information in the system database. Once the user identifier is read by the parking meter, the user will use the parking meter buttons to complete the payment transaction. If the user identifier is an RFID tag affixed to the user's cell phone, the reader may be activated by selecting buttons on the cell phone. After the payment transaction is completed, the parking meter receives data from the management system to set the parking session time. In other embodiments, the parking meter may receive the user identifier by reading input from the user, for example, by user input via a keypad or the like.

Making payment using an RFID tag and the parking meter RFID reader can be just as quick as payment with a coin or credit card. Purchased time will be displayed on the parking meter and the credit card associated with the RFID tag will be processed for payment (which could be in bulk or for each transaction).

The parking meter includes a timing mechanism that counts down the time remaining in the parking session according to the payment made. When the time on the parking meter is about to expire, the meter or associated meter management system can send an expiration message to the user via the phone number associated with the user identifier used for the initial payment and/or via email or the like to ask the user if the user wishes to purchase additional time. If the user does not, then the meter lets the time for the parking session expire and it sets a display or other indicator accordingly. Enforcement personnel can then issue a citation, if appropriate. If the person wants to purchase additional time in response to the expiration message, the person can accept to pay via return email or text message or the like. The expiration message to the user can identify the parking space location. The return response from the user will contain information on the pole number (or other identifier of the parking space location) and the additional time to be purchased. Since the phone number used to direct the expiration message is associated with a credit card of the registered user, the credit card can be processed for additional time. The card associated with the registered user can be a debit card or other form of payment card. Moreover, it is optional that the user's registered account may be configured so that the user's payment card is pre-authorized to pay parking charges from the management system, or the user may establish a pre-paid debit account with the management system, such that additional charges to extend the parking session will be automatically deducted from the user's account on file once the additional payment has been processed and authorized.

Thus, the parking meter will automatically initiate a communication session with management system just prior to expiration of the parking session to determine if additional time has been purchased. If no additional time has been purchased, the meter will let the time expire as it normally would. If additional time has been purchased, then information about the additional time for the parking session will be downloaded directly to the parking meter during the communication session and the parking meter will update its display accordingly. The parking meter will then deactivate at least a portion of its communication subsystem (i.e., power-down some of its circuitry) to reduce power consumption. The internal timer mechanism of the parking meter will continue to run, until expiration of the parking session is imminent, at which time the communication process described above repeats. In the system described, the additional time purchased via cell phone is displayed on the parking meter without the use of a mesh network for communication, and does not require any special efforts by enforcement personnel to check with the management system before citation at an expired parking meter.

The parking meter may be a single space parking meter. Preferably, the single space parking meter displays an amount of time paid for, thereby not requiring a printer to print out tickets such as commonly used in multi-space parking meter systems.

The transceiver of the parking meter may have a maximum range of up to 150 meters, but could operate at less than 80 meters. The parking meter transceivers may operate in the 2.4 GHz frequency band and may have a power of between 1 mW and 6 mW. At low power levels, batteries could last for months or even years (e.g., up to three years or more).

The parking meter may have a payment received arrangement for receiving an instruction from a call center that payment has been effected, via the call center, from a cellular telephone.

The parking meter may have a solar power charging arrangement whereby the power supply unit is recharged by solar energy. The parking meter device may then also have a power management facility.

As a further feature, the parking meter may have a locating arrangement for independently determining the geographic location of the parking meter. The locating arrangement may be GPS-operable.

The parking meter device may have a management communication arrangement for communicating management information to a management system. For example, such management information may include malfunction details, a tampering alert, duration expiration and the location of the parking meter device.

Embodiments of the disclosure include a method of controlling parking in a single parking bay, which includes accepting payment for parking in the bay by means of coins, parking tokens, a credit or debit card account, a smart card, from an electronic purse, or by means of a cellular telephone.

If payment is effected by means of a cellular telephone, then the method may include receiving an authorization signal that payment for the parking has been made. This signal may be provided by a second financial institution or from a control center.

Instead of an additional payment being received in response to the parking meter communicating a message to the data manager due to a timer reaching a threshold level, a user could initiate the payment with the data manager by placing a call to the system and being placed in communication with the data manager. The data manager then initiates a communication session with the parking meter and transmits the additional time that was purchased to the meter. The parking meter may be in a low power mode such that an incoming call can be received and full operation can be restored, or the parking meter may always be in a full power mode.

The method of controlling parking may include sensing a vehicle identifier associated with the vehicle that is parking at a parking meter. The vehicle identifier uniquely identifies the vehicle and may comprise any of a variety of mechanisms. For example, the vehicle identifier may be a license plate number that is optically detected. The vehicle identifier may be contained in an RFID tag that is attached to the vehicle. An RFID tag on the vehicle could be activated by a parking sensor that is located in proximity to the parking space. The parking sensor can wirelessly communicate the vehicle identifier to the parking meter. The vehicle identifier may be stored at the data manager and linked with a user identifier (e.g., an RFID tag identification number), the credit/debit card, phone information and/or email information of the registered user.

The method of controlling parking may include sensing if a vehicle is parked in the parking space or bay when the paid-for parking time has expired or the maximum parking time has been exceeded, and transmitting a time expired signal to a management center. A location signal, providing the location of the parking space, may also be transmitted.

The data manager may comprise a plurality of data managers that include one or more local data managers that in turn communicate with the management system.

A predetermined number of single-space parking meters, together with an associated local data manager, can form a local group, such that the local data manager communicates with the management system on behalf of the group or any of its members.

The communication facility of a local data manager may communicate with the management system by means of a data channel, which may use a cellular telephone network, a wireless local area network (LAN), a wired LAN, or the Internet.

Communications between the parking meters and the management system may be in regard to payment authorization, arrival event reporting, payment alerts, time lapse alerts, status reports, fault reporting and/or configuration and software updates.

In FIG. 1, an embodiment of a single space parking meter is designated generally by the reference numeral 10. The parking meter 10 includes a location housing 2, a cash collection box 4, a meter unit 6, and a user identifier reader 9 such as an RFID reader or a card reader. The cash collection box 4, the meter unit 6, and the reader 9 are received within the housing 2. The housing 2 is fixedly attached to the pole 8. The cash collection box 4 and meter unit 6 with the reader 9 are removable and replaceable. The reader 9 receives information from a tag 3 (described further below in connection with FIG. 2) and, for example, can be a reader that uses WiFi, Bluetooth, WiMax, or other short range data communication technology, in accordance with the configuration of the tag 3.

In some embodiments, for example, where the tag 3 is configured as an RFID and/or a smart card, the tag is powered by the signal transmitted by the reader 9. In other embodiments, the tag 3 can be powered by a battery. Since the operational distance from the reader 9 to the tag 3 is relatively small, the power consumed by the reader 9 and/or the tag 3 can be very low, such that a relatively small capacity battery that is compact provides sufficient power to the reader and/or the tag. In some embodiments and deployments, the parking meter 10 can be powered by solar panels such as photovoltaic structures, which can supplement or replace battery power. The self-powered feature eliminates the need for wired power connections from an electrical supply utility grid to the meters.

If the tag 3 emits an infrared (IR) beam for data communication, then the reader 9 is configured as an IR reader such that the IR beam of the tag is properly received at the reader.

The embodiment of the location housing 2 in FIG. 1 is a clam-shell type of housing that is affixed to the pole 8 and is configured to mate with a removable meter unit 6. In other embodiments, however, the location housing 2 can be a cabinet or other enclosed space that is configured to mate with one or more removable meter units, where the removable meter units are configured to be mated in compartments or sockets of the cabinet, such that each of the compartments is associated with a physical location that is not necessarily at the same location as the cabinet or the compartment. In other embodiments, the location housing can be another type of receptacle fixedly placed and associated with a physical location.

Figure 2:
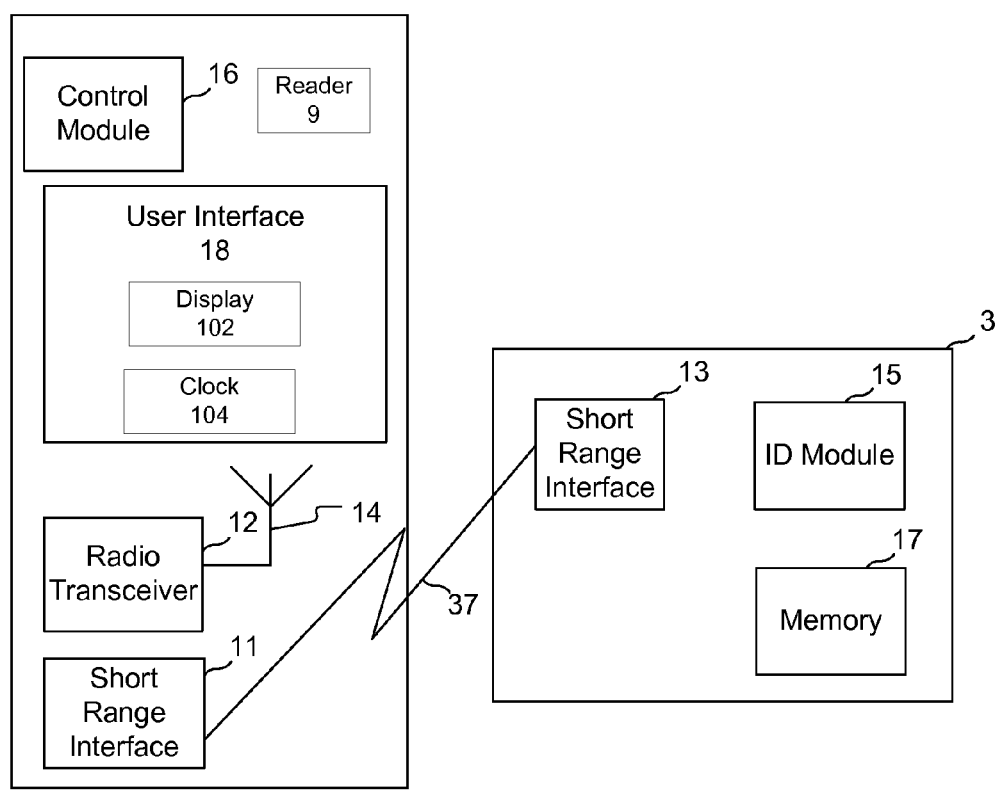
FIG. 2 shows a functional block diagram of a removable meter unit used in the parking meter of FIG. 1.

FIG. 2 shows functional block diagrams of an exemplary removable meter unit 6 and a tag 3 that can be used with meters such as the meter of FIG. 1. The meter unit 6 includes a radio transceiver 12, an antenna 14, a control module 16, and user interface 18. The radio transceiver comprises a communication subsystem of the meter 10 that includes associated circuitry and components for communications as described herein. The control module 16 includes one or more processors such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The control module 16 also includes one or more storage mediums. A storage medium can include one or more memories for storing data, including read only memory (ROM), random access memory (RAM), magnetic RAM, core memory, magnetic disk storage mediums, optical storage mediums, flash memory devices and/or other machine readable mediums for storing information. The control module 16 also includes a clock mechanism, which may be provided by appropriate circuitry or alternative constructions, for counting down time remaining for the current parking session, according to the amount of time paid for by the user.

The user interface 18 provides a means for a location user to interact with the meter unit 6 and can include, for example, a display, one or more lights, and a keypad. The user interface 18 can provide a payment interface including a currency receiver for receiving coins and/or bills from a user in payment for using the parking location, as well as a reader for processing credit cards, debit cards, payment tokens, and the like. The control module 16 is coupled to the user payment interface and is configured to receive payment information regarding the amount of a payment and/or card or token information received at the payment interface. The control module 16 communicates the payment information from the user interface 18, via the radio transceiver 12, with the management system, or a local data manager of the management system. The one or more lights of the user interface 18 can be used as an indicator as to the payment status or, as discussed further below, can be used to produce an indication that a parking space that is associated with the location of the meter 10 is occupied.

The user interface 18 also includes a display 102 and an internal clock 104. The display 102 is visible to enforcement personnel, who check for expiration of the time remaining for the current parking session. In addition, the meter unit 6 also includes a short range interface 11 by means of which it communicates with the tag 3. The tag 3 has a short range interface 13, an ID module 15, and an optional memory module 17 for storing identification information regarding the registered user. The meter unit 6 is linked to the tag 3 for data communications by a link 37. The link 37 can be, for example, a radio frequency link or an optical link. The short range interfaces 11 and 13 can be any type of near-field communications (NFC) devices such as, for example, RFID devices, Bluetooth devices, WiFi devices, IR devices, smart card devices, and the like, in accordance with the link 37.

In one embodiment, the control module 16 communicates the identification information, via the link 37, to the short range interface 13 of the tag 3. The short range interface 13 can update the optional memory module 17 based on the received payment information, such as remaining prepaid balance or the like. The memory module 17 can deduct the amount of payment indicated to have been paid. In addition, the memory module 17 can also receive and store transaction-time information including the date and time of day that the payment was made.

The ID module 15 also stores a unique identifier, e.g., a serial number, that is associated with the tag 3. Preferably, the unique identifier of the tag 3 and the value stored in the memory module 17 are externally readable via the short range interface 13. The identifier of the tag 3 and value stored in the memory module 17 may be read, for example, by a suitable reader of the control module 16. If the short range interface 13 is an RFID module, then the reader could be an RFID reader. Other types of readers that can be used depend on the configuration of the tag and module, but can include devices such as IR readers, smart card readers (contact or non-contact), plug-in readers, and the like. In this way, reading the identification information stored in the memory module 17 and the identifier of the associated tag 3 can be performed in order to determine the registered user and track payments.

Figure 3:
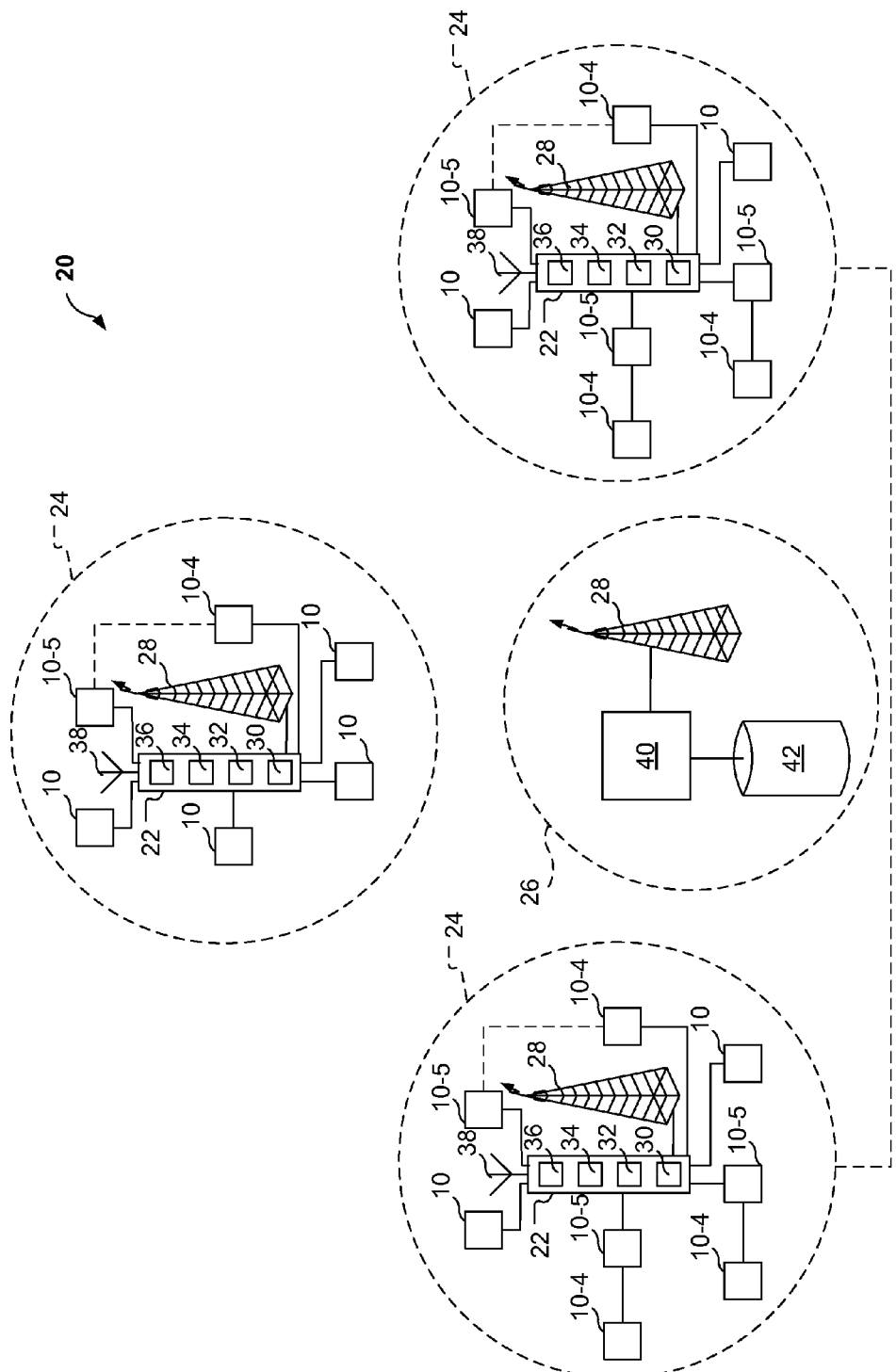
FIG. 3 is a schematic illustration of a parking meter system which uses a number of the parking meters of FIG. 1.

Referring to FIG. 3, a parking meter system that uses a number of the parking meters of FIG. 1 is designated generally by the reference numeral 20. The system 20 utilizes a number of the parking meters 10. In general, the system includes one parking meter 10 for each parking space. Each of the parking meters 10 communicates with a management system, designated in FIG. 3 by the reference 26. The parking meters can be operated according to groups, such that a predetermined number of parking meters 10 comprise group members and each group includes a local data manager 22. Thus, each group of parking meters 10 and its associated local data manager 22 can form a local group 24. In FIG. 3, each operational group is indicated by a dashed line. In one embodiment, there are approximately thirty parking meters 10 in each local group 24. For simplicity of illustration, not all the parking meters 10 are shown in the local groups 24 illustrated in FIG. 3.

Each of the parking meters 10 communicates with the management system 26. They may also additionally communicate with their respective local data manager 22. In the example system 20 this is effected by means of a cellular telephone network, with each local data manager 22 and the management system 26 being connected to a respective base station 28 of the cellular telephone network. Data links are thereby established between the local data managers 22 and the management system 26. Similarly, communication can be established between the parking meters 10 and the management system 26. The management system 26 can perform management tasks associated with maintaining the local data managers 22 in proper operational condition and managing operations of the system. In FIG. 3, the management system 26 is generally indicated by dashed lines. Although only three local groups 24 are shown in FIG. 3, it should be understood that there can be more or fewer of the local groups 24.

Each local data manager 22 has a modem 30, a control device 32, a memory 34, and a radio transceiver 36 with an antenna 38. As indicated above, each local data manager 22 communicates with the parking meters 10 in its local group 60 via its radio transceiver 36 and the radio transceiver 12 of the parking meter 10. The local data managers 22 may do so directly, or indirectly via another parking meter 10 as indicated with parking meters 10-4 and 10-5 in FIG. 3.

The memory 34 of a data manager 22 can include one or more memories for storing data, including read only memory (ROM), random access memory (RAM), magnetic RAM, core memory, magnetic disk storage mediums, optical storage mediums, flash memory devices and/or other machine readable mediums for storing information. The memory 34 stores the payment collection history information received from the parking meters 10 in the local group 60. The payment collection history information stored in the memory 34 is communicated to the management system 26 via the modem 30, the base station 28 and any intervening networks such as, for example, the Internet.

The control device 32 comprises one or more processors coupled to the memory 34 and configured to control the functions associated with the radio transceiver 36 and the modem 30. The processor can include one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof.

Alternatively to communicating with a local data manager 22, some embodiments can provide the parking meter 10 with a radio transceiver 12, shown in FIG. 2, that communicates with the management system 26 rather than through a local data manager 22. In these embodiments, the radio transceiver 12 can comprise a cellular telephone transceiver, a MAN transceiver, a satellite transceiver, or other type of transceiver that communicates over a network to the management system 26 without using an intermediary (local) data manager.

The management system 26 communicates with the parking meters 10 and optional local data managers 22 and includes a controller 40 with a modem and a database store 42. It also has a communication module for communicating with financial institutions (not shown) to obtain authorization for credit or debit card payments and payment. The modem of the management system 26 can be any modem configured to communicate over a network such as 3G networks or the Internet. In one embodiment, the data store 42 includes a database that stores tag IDs and/or parking sensor IDs and associates the IDs with the unique physical locations and the removable meter unit IDs in order to store the payment collection histories.

In a typical implementation, the transceivers 12 of the removable meter units 6 and the transceivers 36 of the local data mangers 22 have a power rating of about 1 mW and have a useful range of about 80 meters. Thus, each local group 24 can extend over an area having a radius of approximately 80 meters. Such a configuration is easily achievable with currently available technology. Alternative configurations may be suitable with other operating ranges and technologies.

In use, if a person wishing to park at a space associated with a parking meter as described herein wants to pay for parking time by means of a tag comprising a credit card or debit card or other payment token, the relevant information is read by a reader of the parking meter and is transmitted to the management system 26, directly over the cell telephone network or via the relevant local data manager 22. The management system 26 obtains authorization and communicates the authorization back to the appropriate parking meter 10 directly or via the relevant local data manager 22. Status reports, fault reporting, and/or configuration and software updates, may be communicated between the parking meters 10, the local data manager 22, and/or the management system 26.

In one embodiment where the parking meter 10-4 can communicate with one or more other intermediate parking meters 10-5, and the intermediate parking meter 10-5 in turn can communicate with the local data manger 22, the parking meters 10-4 and 10-5 can communicate using a mesh network protocol. Mesh network protocols can be provided by several conventional protocols including Bluetooth, WiFi, and 802-15 (e.g., 802.15.4 commonly referred to as WPAN (Wireless Personal Area Network) including Dust, ArchRock, and ZigBee).

Figure 4:
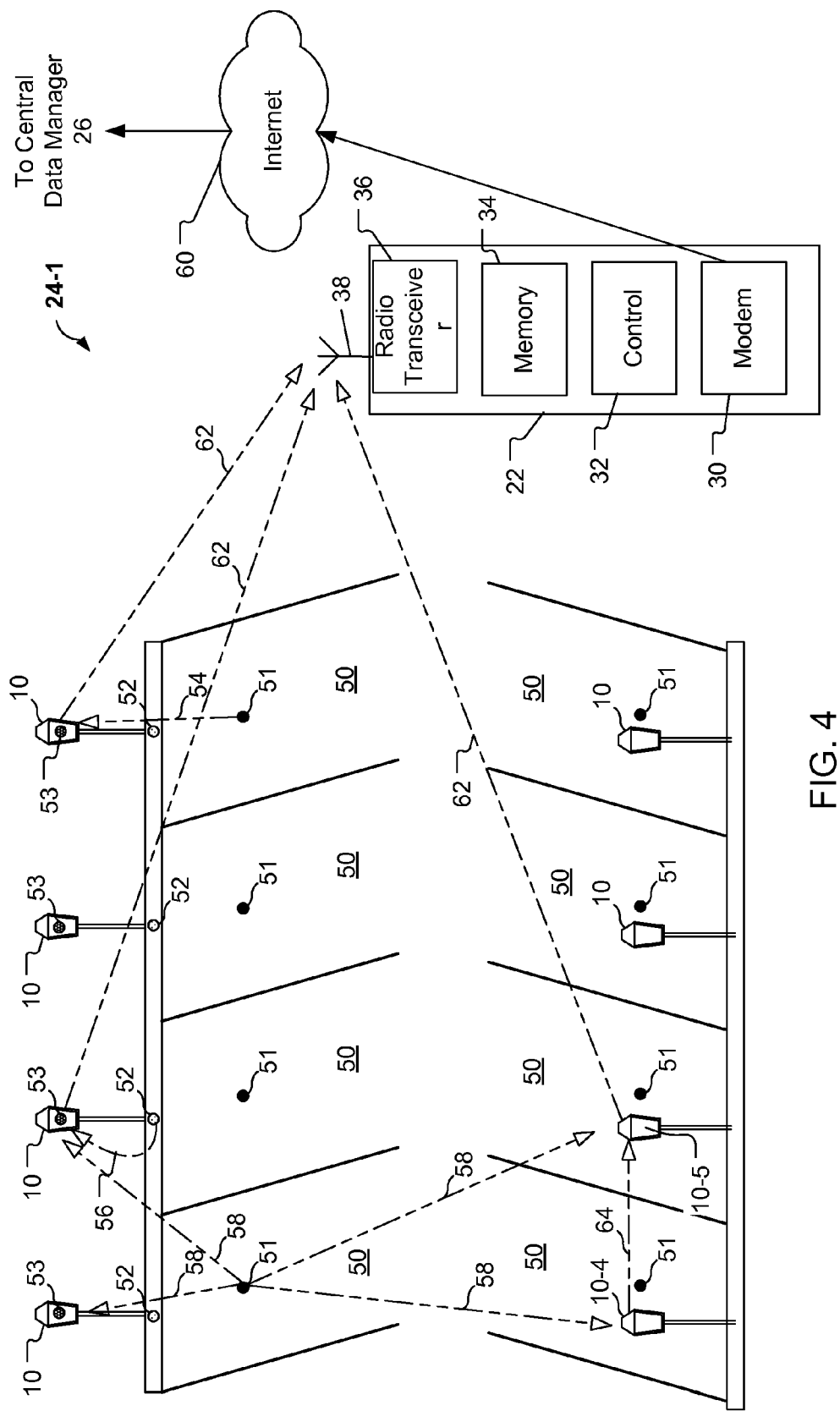
FIG. 4 shows an example of a local group of parking meters that can be monitored by the parking meter system of FIG. 3.

Referring to FIG. 4, an example of a local group 24-1 of parking meters 10 that can be monitored by the parking meter system 20 of FIG. 3 is shown. The local group 24-1 includes eight parking meters 10, but other numbers of parking meters 10 could be included in the local group 24-1. Each parking meter 10 is fixedly located at and associated with a parking space 50. The parking spaces 50 are angled parking spaces that could be located in a parking lot or on a street, for example. Other arrangements of parking spaces are suitable, such as parallel spaces, and will occur to those skilled in the art.

The parking meters 10 each include a removable meter unit 6, such as the removable meter units 6-1 and 6-2 illustrated in FIGS. 2A and 2B, that include a radio transceiver 12. The eight parking meters 10 communicate, via the radio transceiver 12, with the antenna 38 and the radio transceiver 36 of the local data manager 22. The parking meters 10 can communicate directly with the local data manager 22, as illustrated by connections 62, or indirectly (e.g., using a mesh network) via one of the other parking meters 10, as illustrated by connection 64 between parking meters 10-4 and 10-5. As discussed above, the removable meter units communicate information to the local data manager 22, the information including tag IDs, parking sensor IDs, removable meter unit IDs, payment collection information including currency received and credit/debit card information.

Each of the parking spaces 50 has an associated parking sensor that detects when a vehicle is parked in the parking space 50. Each of the parking spaces 50 in the local group 24-1 is shown with three parking sensors 51, 52, and 53. Typically, a single parking space 50 only has one parking sensor, it should be understood that the example shown in FIG. 4 shows three possible locations for purposes of illustration.

The parking sensors 51, 52, and 53 can be any of various sensors to detect occupancy (and vacating) of the physical location associated with the space 50, including magnetic field sensors, motion sensors, contact sensors, and the like. The parking sensors 51 and 52 are located away from the parking meters 10 whereas a sensor such as the parking sensor 53 is co-located with one of the parking meters 10. Preferably, each of the remote parking sensors 51 and 52 includes a short range wireless interface that is configured to communicate with the short range interface 11 of the parking meters 10, as illustrated by the connections 54 and 56 in FIG. 4. Alternatively, the remote parking sensors 51 and 52 could be connected via a wire to one of the parking meters 10. The co-located parking sensors 53 could be connected via a wired or wireless connection to the parking meter 10 with which each is co-located (e.g., using similar connections as the tag connection 37 discussed above).

The parking sensor 51 could be, for example a magnetic field sensor that is affected by the presence of a large metallic object such as a vehicle. The parking sensor 51 could also be a motion sensor that is triggered by motion of a vehicle or a contact sensor (including sensors such as an accelerometer or inclinometer) that is triggered by the weight of a vehicle. The location of the parking sensor 51 as depicted in FIG. 4 is only an example. Those skilled in the art will understand that other locations could also be suitable. The parking sensors 51 are sufficiently sensitive to detect a vehicle that is present in the parking space 50 with which the particular parking sensor 51 is uniquely associated, but are not so sensitive that they produce a "false positive" signal, such as if they mistakenly determine that a vehicle in a neighboring parking space is parked in the parking space 50 that is uniquely associated with the particular parking sensor 51 and parking meter 10.

The parking sensors 52 are located at the base of each parking meter 10. For example, a sensor 52 could be located at the bottom of the support pole 8 for a meter (see FIG. 1). This location has the advantage of being close to the parking meter 10, thereby affording a short transmission distance and low power consumption for communications. In addition, with a base location, the parking sensor 52 will not be blocked by the presence of a vehicle in the associated parking space, as would be the case if the parking sensor 51 were located in the middle of the parking space 50. The parking sensors 52 detect the presence of a vehicle in the associated space and can be sensors such as magnetic sensors, motion sensors, or contact sensors.

The co-located sensors 53 could also be magnetic sensors, motion sensors, or contact sensors. In the case of contact sensors, the parking sensor 53 could simply be a button that a person manually interacts with, thereby alerting the meter 10 that the associated parking space is occupied.

The remote parking sensors 51 and 52 can be powered by an internal battery. The typical transmission distances are relatively small, so the battery lifetime with currently available technology can be on the order of months or even years. Alternatively, the remote parking sensors 51 and 52 could be powered by the meter 10 (e.g., via battery or solar cell contained in the meter 10) if they are connected via a wire. The co-located parking sensor 53 can be powered by a power source at the meter 10 (e.g., a battery or solar cell).

In some embodiments, the vehicle sensors 51, 52 and 53 can sense an identifier associated with the vehicle that is parking at a meter 10. The vehicle identifier may be a license plate number that is optically detected. The vehicle identifier may be contained in an RFID tag, or other type of tag that can communicate with the sensor using NFC, that is attached to the vehicle. An RFID tag on the vehicle could be activated by any one of the sensors 51, 52 or 53 that is located on the meter, on the curb or in the street in the parking space, respectively. The parking sensor 51, 52 or 53 can wirelessly communicate the vehicle identifier to the meter 10. The vehicle identifier could be stored at the data manager and linked with a user identifier (e.g., a RFID tag identification number), the credit/debit card, phone information and/or email information of the registered user.

Regardless of which type of sensors are used, the parking sensors 51, 52, 53 are configured to transmit an indication of an arrival event to one of the meters 10 that is uniquely associated with the parking space 50 where the parking sensor is located. In an alternative embodiment, the parking sensors 51, 52, 53 could transmit to any of the parking meters 10, as illustrated by the multicast connections 58. In this embodiment, the local group 24-1 could employ a mesh network protocol. In such a configuration, the parking meters 10 that receive the transmission from another sensor will forward the arrival event notification to the local data manager 22.

Each of the parking sensors 51, 52, 53 has an ID, e.g., a serial number, that is transmitted with the arrival event indication to the parking meters 10. The local data manager 22, or alternatively the central data manager 26, maintains a data base that associates the parking sensor IDs with tag IDs, meter IDs, and location information. This database is used to keep track of which locations are occupied and to keep track of the currency collected and handling credit or debit card transactions associated with each location (space).

In the embodiment shown in FIG. 4, the local data manager 22 uses the modem 30 to communicate with the central data manager 26 via the Internet 60. It should be understood that "modem" as used herein refers to any device that provides a communications interface between the local data manager and the network. The information communicated to the central data manager 26 includes tag IDs, removable meter unit IDs, arrival event indication reports, alerts regarding failure to receive payment subsequent to detecting an arrival event, and payment collection information including currency received and credit/debit card information.

Figure 5:
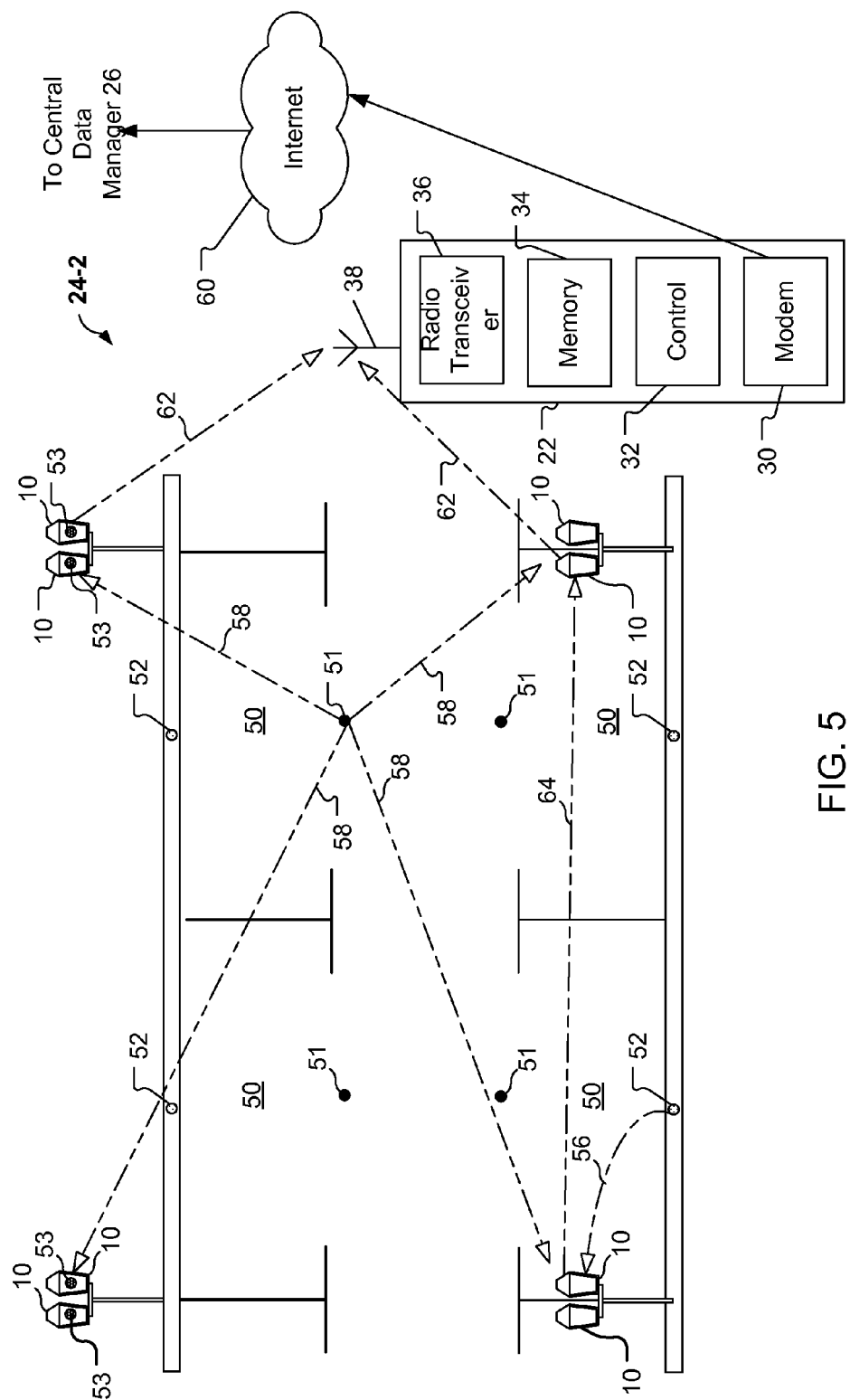
FIG. 5 shows another example of a local group of parking meters that can be monitored by the parking meter system of FIG. 3.

Referring to FIG. 5, another example of a local group 24-2 of parking meters 10 that can be monitored by the parking meter system 20 of FIG. 3 is shown. The local group 24-2 includes eight parking meters 10, but other numbers of parking meters 10 could be included in the local group 24-2. Each parking meter 10 is fixedly located at and associated with a parking space 50 (only four of the eight parking spaces 50 are shown). The parking spaces 50 are parallel parking spaces that can be located on a street, for example.

The parking meters 10 each include a removable meter unit 6, such as the removable meter units 6-1 and 6-2 illustrated in FIGS. 2A and 2B, that include a radio transceiver 12. The eight parking meters 10 communicate, via the network transceiver 12 with the antenna 38 and the radio transceiver 36 of the local data manager 22. The parking meters 10 can communicate directly with the local data manager 22, as illustrated by connections 62, or indirectly (e.g., using a mesh network) via one of the other parking meters 10, as illustrated by connection 64 between parking meters 10-4 and 10-5. As discussed above, the removable meter units communicate information to the local data manager 22 which then communicates the information to the central data manager 26, e.g. via the modem 30 and the Internet 60. The information communicated to the central data manager 26 includes tag IDs, removable meter unit IDs, arrival event indication reports, alerts regarding failure to receive payment subsequent to detecting an arrival event, and payment collection information including currency received and credit/debit card information.

The location of the parking sensors 51 in the local group 24-2 is illustrated as being in the street at the edge of the respective parking spaces 50. This sensor location ensures that the sensor transmission signals will not be blocked by a vehicle parked in the parking space 50. In one embodiment, the parking sensors 51-53 transmit to any of the parking meters 10 utilizing a mesh network protocol, as illustrated by the connections 58.

In one embodiment, the parking sensors 51, 52, 53 use shielding in order to detect an arrival event when a vehicle enters the associated parking space 50 and to avoid a false arrival event detection, e.g. due to vehicle traffic in the street or parking lot where the parking space 50 is located. The shielding can include physical shielding that prevents detection in one or more directions. For example, the parking sensors 51 in FIG. 5 could be shielded from detecting vehicles in the street. The shielding can also be implemented in software where signals emanating from one or more directions are not considered indicative of an arrival event.

Figure 6:
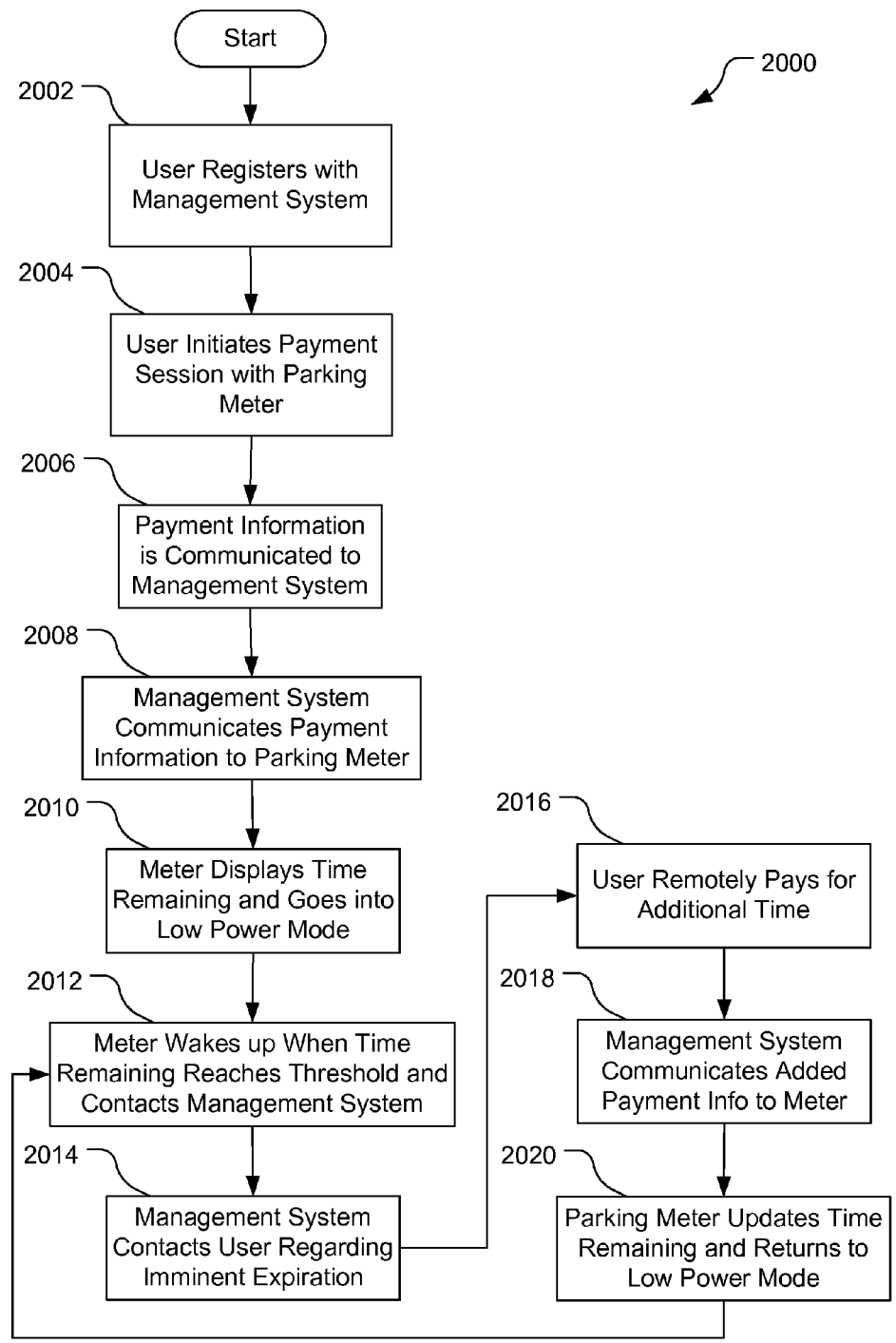
FIG. 6 shows a flowchart of an embodiment of a process for remote payment of a meter such as the parking meter of FIG. 1 in the system of FIG. 3, including remotely adding time to the meter prior to expiration of the meter.

Referring to FIG. 6, a flowchart of an embodiment of a process 2000 for operating a meter in the parking meter system 20 of FIG. 3 is illustrated. The process 2000 illustrates an embodiment for making remote payments associated with a parking meter such as the parking meters of FIG. 1, including remotely adding time to the parking meter prior to expiration of time at the meter. The embodiment of the process 2000 uses an RFID tag as the user identifier, but other embodiments could user other forms of user identifier such as a credit card, a debit card, a smart card (contact or contactless), or a driver's license, for example.

The time addition process 2000 starts at block 2002 where a user of the pay-by-cell service registers with the management system 26 of the parking meter system 20. The registration can be conducted over the Internet, in person, over a telecommunication system, or by any other method that can provide the user registration information. At registration, the user provides credit/debit card information for a credit/debit card that will be used to make the pay-by-cell payments. Optionally, the user could also provide bank account information. The user also provides cell phone information (e.g., handheld or in-vehicle) with which the user can be contacted regarding future pay-by-cell notifications.

In one embodiment, the user is provided with an RFID tag that can be used to communicate with a parking meter 10. In this embodiment, an RFID tag identification number is also linked to the credit/debit card, phone information and/or email information of the registered user. This tag identification number creates an association between the credit card, the RFID tag, the cell phone number and/or the email address of the registered user. The RFID tag can be carried about by the registered user and can be placed on a key chain, in a wallet, or affixed to the back of a cell phone, for example.

After registering with the management system 26, the user, at block 2004, initiates a payment session with a parking meter where the user is parking a car at a designated location associated with the parking meter. The user can initiate the session by pushing a button on the user interface 18 of the parking meter. Pushing the button wakes up the control module 16 (FIG. 2) of the parking meter 10. Alternatively to pushing a button, the user could initiate reading of a smart card, a credit/debit card, an RFID tag, a driver's license or other user identifier by inserting one of the cards into a card reader or placing the RFID tag or contactless smart card in proximity to a respective reader of the parking meter.

In one embodiment, initiating the payment session at block 2004 includes a parking sensor (e.g., one of the parking sensors 51, 52 or 53 shown in FIGS. 4 and 5) sensing an identifier associated with a vehicle that is parking at a parking meter. The vehicle identifier may be provided in a variety of mechanisms, such as a license plate number that is optically detected by the sensor. The vehicle identifier may be contained in an RFID tag that is attached to the vehicle. An RFID tag on the vehicle could be activated by a parking sensor that is located in proximity to the parking space. The parking sensor can wirelessly communicate the vehicle identifier to the parking meter. The vehicle identifier could be stored at the data manager and linked with a user identifier (e.g., a RFID tag identification number), the credit/debit card, phone information and/or email information of the registered user.

Upon initiation of the payment session at the block 2004, the process 2000 continues to block 2006, where payment information is communicated to the management system 26. In one embodiment, the user uses a cellular phone to communicate the payment information (e.g., user identification and/or an amount of time to be purchased) and to communicate the meter identification information to the management system 26. In one embodiment, the management system 26 can use a caller ID feature of the cellular telephone network to identify the registered user and to identify the associated credit/debit card information of the user.

In another embodiment, the user swipes the RFID tag 3 provided following the registration in the proximity of an RFID reader associated with the parking meter, such as a reader integrated with the control module 16. The swipe wakes up the parking meter, which then contacts the management system 26, via the radio transceiver 12, with the RFID tag identification number and with the amount of time being paid for (this could be entered by the user using the user interface 18). The management system 26 then uses the RFID tag identification number to identify the associated credit/debit card information of the user and confirm payment to the meter.

Upon receiving the payment information at block 2006, the management system 26 processes the payment transaction. Upon successful completion of the payment transaction, the process 2000 continues to block 2008 where the management system 26 wirelessly communicates information confirming the successful payment of the amount of time requested by the user to the parking meter. At block 2010, the control module 16 of the parking meter causes the purchased time to be displayed on the display 102 of the user interface 18. At this point, the parking meter goes into a low power mode. The low power mode can shut off power to all systems of the parking meter except the internal clock and the meter display. For example, all communication circuitry of the meter can be turned off. In addition, the control module 16 can periodically monitor the paid time remaining. The meter display is visible to parking enforcement personnel.

At block 2012, the control module 16 wakes up when the internal clock indicates that the paid parking time remaining falls below a threshold level. For example, if the time remaining falls below 5 minutes, the clock could signal the control module to wake up. Upon waking up, the control module 16 contacts the management system 26, using the radio transceiver 12. The central data manager then contacts the user, at block 2014, via a text message to the cell phone of the user. In one embodiment, the parking meter contacts the user directly at block 2012 via a text message, for example, and in that case the block 2014 can be omitted. In order to contact the user directly, at block 2012, the phone number of the user could have been communicated to the parking meter by the management system 26.

The text message sent to the user informs the user that the time is about to expire and provides a phone number or email address where the management system 26 can be contacted. If the user wishes to add time to the meter, the user contacts the management system 26 at block 2016. The user can contact the central data manager by email, text message or phone call. If the user chooses not to add time, the clock at the parking meter will expire and the parking meter can display a violation indication. The parking meter can contact the management system 26 just prior to expiration to see if additional time has been purchased.

If the user chooses to pay for additional time to park at the parking meter, the process 2000 continues to block 2018, where the management system, upon receiving the user's request for additional time, processes another payment transaction. In one embodiment, the credit card could have been used to pay for pre-paid parking time, thereby creating an account of minutes associated with the registered user, and minutes could be deducted from the user's account. Upon successful completion of the payment transaction, the management system 26 communicates information indicating the additionally purchased time to the radio transceiver 12 of the parking meter. In some embodiments, upon successful completion of the payment transaction, the management system 26 communicates an electronic receipt to the cell phone of the user and/or to an email account of the user. The management system 26 could alternatively communicate the receipt to a Web site that the user can use to retrieve the receipt at a later date.

At block 2020, the radio transceiver 12 of the parking meter receives the additional time information and adds the additional time to the time remaining, if the meter has not expired already, to determine an updated time remaining. The updated time remaining is then displayed on the display 102 of the user interface 18. The parking meter then returns to the low power mode, such as a sleep mode, and the process 2000 continues back to the block 2012, where the control module 16 periodically checks the time remaining and will again wake up the communication circuitry when the time remaining for the parking session falls below the threshold level.

The process 2000 is exemplary and it should be understood that blocks can be omitted, rearranged and/or new blocks added. For example, the management system 26 could contact the user at block 2014 prior to receiving a message from the parking meter at block 2012. In this example, the actions at block 2012 could be omitted since the management system 26 contacts the user without notification from the parking meter.

Figure 7:
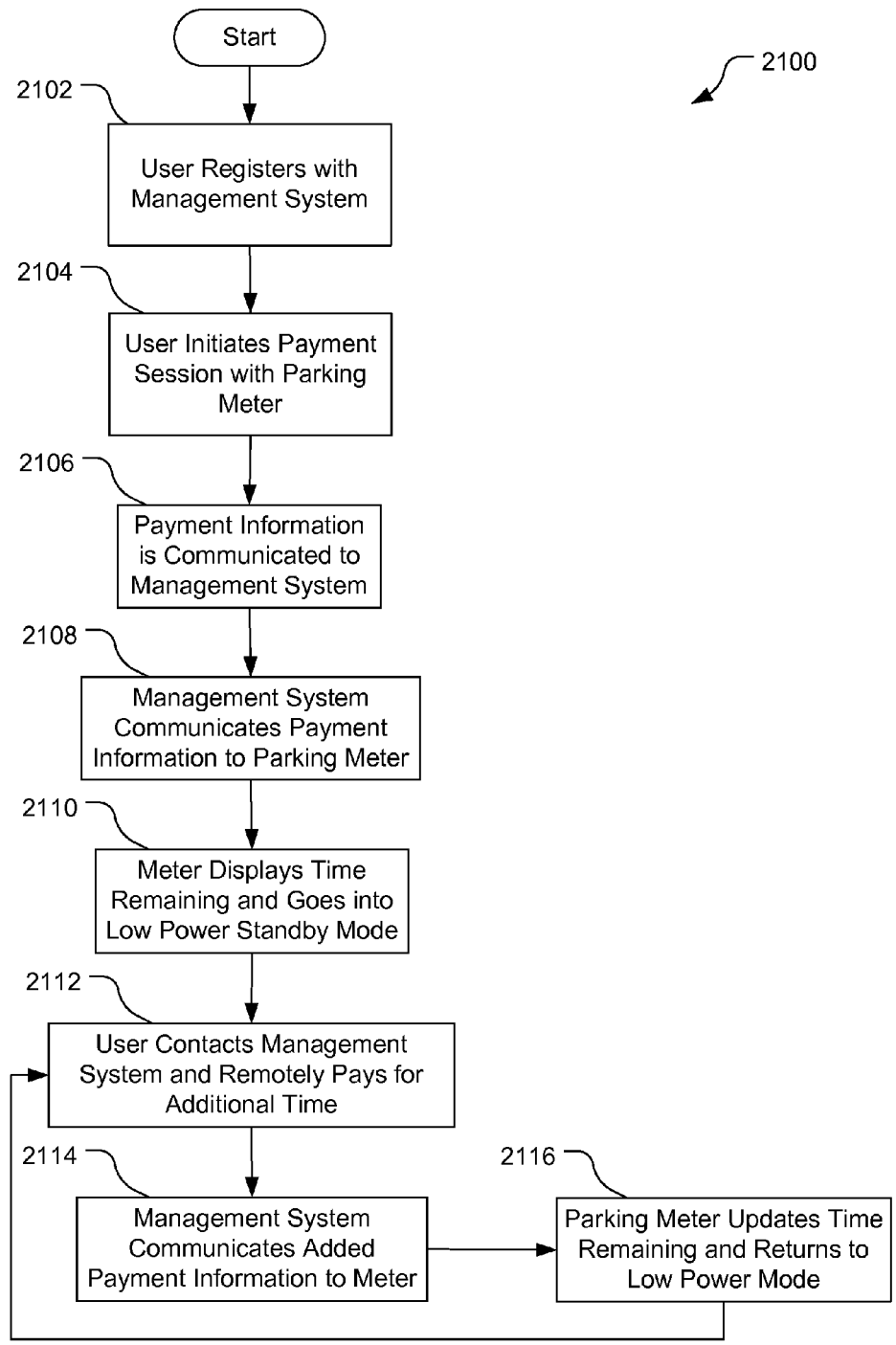
FIG. 7 shows a flowchart of an embodiment of a process for user-initiated remote payment of a meter such as the parking meter of FIG. 1 in the system of FIG. 3.

Referring to FIG. 7, a flowchart of an embodiment of a process 2100 for user-initiated remote payment of a meter such as the parking meter of FIG. 1 in the system of FIG. 3 includes the stages shown. The process 2100 enables a user to add additional time when the user knows that time will expire before the user can get back to the parking space and replenish the meter time. Stages 2102, 2104, 2106, 2108, and 2110 are the same as the stages 2002, 2004, 2006, 2008, and 2010, respectively, discussed above in reference to the process 2000 of FIG. 6. In the process 2100, entering a low power mode at stage 2110 is optional such that the parking meter can be either fully powered or in a low power mode. In the low power mode, the radio transceiver 12 is powered such that it can detect an incoming call and restore full operation of the meter.

At stage 2112, the registered user contacts the management system 26 using the cell phone that the user registered at stage 2102. The management system 26 can identify the cell phone of the user which will then identify the user and the parking meter that the user paid for at stage 2104. The user then remotely pays for additional time using voice commands or key presses on the cell phone.

Subsequent to the user remotely paying for additional time, the process 2100 continues at stage 2114 where the management system 26, upon receiving the user's request for additional time, processes another payment transaction. In one embodiment, the credit card could have been used to pay for pre-paid parking time, thereby creating an account of minutes associated with the registered user, and minutes could be deducted from the user's account. Upon successful completion of the payment transaction, the management system 26 initiates a communication session with the parking meter and communicates information indicating the additionally purchased time to the radio transceiver 12 of the parking meter.

At block 2116, the radio transceiver 12 of the parking meter receives the additional time information and adds the additional time to the time remaining, if the meter has not expired already, to determine an updated time remaining. The updated time remaining is then displayed on the display 102 of the user interface 18. The parking meter then optionally returns to the low power mode and the process 2100 continues back to the block 2112.

The process 2100 is exemplary and it should be understood that blocks can be omitted, rearranged and/or new blocks added.

Embodiments in accordance with the disclosure can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement embodiments in accordance with the disclosure.

The systems and methods discussed above involved the use of parking meters located and associated with specific parking space locations. However, the above methods and systems are applicable to monitor other scenarios where a measurable quantity of product or an amount of measurable time that a product is being consumed is associated with a unique physical location. For example, an arrival event could be a person moving up to a walk-up space in a queue, or a package arriving at a certain point on a conveyor, e.g., in a production process.

The systems and techniques described herein may be used in conjunction with a wide variety of parking meters configured to operate as described herein. For example, the remote payment techniques as described herein may be carried out with suitably configured parking meters of the type described in U.S. patent application Ser. No. 12/072,524 entitled "Parking Meter" assigned to the assignee of the present invention. The contents of the aforementioned U.S. patent application Ser. No. 12/072,524 are incorporated herein in their entirety for all purposes.

The parking meter described the aforementioned U.S. patent application Ser. No. 12/072,524 includes features comprising a coin sensor, a card reader, and an electronic device electrically connected to the sensor and reader so as to receive information electronically therefrom, the electronic device having a screen to provide information visually, a telephone connection to provide receiving information in respect of a card used in respect of said card reader, and connections for at least one rechargeable battery to power the reader, sensor and device. The parking meter also includes a solar cell operatively associated with said connections to charge said battery, a housing in which the coin sensor, card reader, and electronic device are located. The housing comprises an intermediate panel set and a cover panel, wherein the cover panel is movably attached to the intermediate panel set, and a surface of the cover panel and a surface of the intermediate panel set comprise a front face, and the front face surface of the cover panel includes a control panel having a window and a plurality of buttons that operate the parking meter upon manipulation by a user, a coin slot in the front face into which coins are inserted for delivery to the sensor and then to a coin receptacle, a card slot in the front face into which a card is inserted to be read by said reader, a rear face comprising a surface of the cover panel and a surface of the intermediate panel set providing a window aperture via which said solar cell is exposed to light. The parking meter operates such that the coin sensor and the card reader are electrically linked to provide information to the electronic device to provide information of whether payment has been made, and the screen of the electronic device is visible through the window of the control panel when the cover panel is attached to the intermediate panel. One or more of these features may be incorporated into a parking meter that is otherwise configured for operation in accordance with the description herein.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be achieved in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information.

While the principles of the disclosure have been described above in connection with specific apparatuses and methods, it is to be clearly understood that this description is made only by way of example and not as limitation on the scope of the disclosure.

We claim:

1. A meter device comprising:
   a. an internal clock;
   b. a display;
   c. a communication subsystem configured to provide two-way wireless communication;
   d. a controller module coupled to the internal clock, the display and the communication subsystem, the controller configured to control the communication subsystem to receive data indicative of a remote payment being completed, control the display to display an amount of time purchased by the remote payment for a parking session, monitor the clock to determine a first amount of time remaining in the parking session, control the display to display the first amount of time remaining, power down at least a portion of the communication subsystem subsequent to receiving the data indicative of the remote payment being completed, wake up the powered down portion of the communication subsystem upon determining that the first amount of time remaining is below a threshold time prior to expiration of the parking session, receive an indication of additional time being paid for remotely, and control the display to update the displayed time remaining to reflect the additional time in a second amount of time remaining.

2. The meter device of claim 1, wherein the controller is further configured to, upon waking up the powered down portion of the communication subsystem, control the communication subsystem to transmit a message to a remote management system indicating the time remaining is about to expire.

3. The meter device of claim 1, wherein the controller is further configured to, upon waking up the powered down portion of the communication subsystem, control the communication subsystem to transmit a message to a wireless device of a user that made the remote payment indicating the time remaining is about to expire.

4. The meter device of claim 1, wherein a portion of the communication subsystem that is not powered down by the controller enables the communication subsystem to receive an incoming signal.

5. The meter device of claim 4, wherein the controller is further configured to control the portion of the communication subsystem that is not powered down to receive the incoming signal and to wake up the powered down portion of the communication subsystem in response to receiving the incoming signal.

6. The meter device of claim 5, wherein the controller is configured to control the communications subsystem to receive data indicative of another remote payment being completed subsequent to receiving the incoming signal, and to control the display to update the displayed time remaining to reflect additional time purchased by the another remote payment.

7. The meter device of claim 1, further comprising: a reader device configured to read identification information from a user identifier in close proximity to the reader device; wherein the controller is configured to receive the identification information from the reader device, and control the communication subsystem to transmit the identification information to the remote management system, the identification information being linked to a user that is making the remote payment and the identification information being transmitted to the management system prior to receiving the data indicative of the remote payment being completed.

8. The meter device of claim 7, wherein the reader device is a RFID reader and the user identifier is a RFID tag.

9. The meter device of claim 1, further comprising: a sensor configured to detect a presence of a vehicle in a parking space associated with the meter device, and read identification information from the vehicle present in the parking space; wherein the controller is further configured to control the communication subsystem to receive the identification information from the sensor, the identification information being linked to a user that is making the remote purchase, and control the communication subsystem to transmit the identification information to the remote management system, the identification information being transmitted to the management system prior to receiving the data indicative of the remote payment being completed.

10. The meter device of claim 9, wherein the sensor comprises an RFID reader configured to read the vehicle identification information from a RFID tag coupled to the vehicle.

11. A method of operating a parking meter, the method comprising:
    a. responding to activation of a reader by reading a user identifier;
    b. activating communication circuitry of the parking meter and communicating user identification information read from the user identifier to a management system for associating a registered user with the user identification information, the communication circuitry configured to provide two-way wireless communication;
    c. receiving time information from the management system indicating a set time for a current parking session and initiating a-countdown of the set time toward zero, and then deactivating at least a portion of the communication circuitry;

d. activating the deactivated portion of the communication circuitry in step c and initiating a communication session with the management system at a predetermined time prior to expiration of the parking session set time to receive information from the management system that determines if additional time should be added to the set time in response to a remote payment by a user;

e. responding to received information that determines that no additional time should be added by continuing the countdown toward zero and adjusting a display of the parking meter accordingly and then deactivating at least a portion of the communication circuitry and resuming the countdown of the set time toward zero;

f. responding to received information that determines that additional time should be added by increasing the time remaining in the current parking session by the additional time determined by the received information and adjusting a display of the parking meter accordingly and then deactivating the at least a portion of the communication circuitry and resuming the countdown of the set time toward zero.

12. The method of operating the parking meter of claim 11, further comprising: upon initiating the communication session, transmitting a message to the management system indicating the set time remaining is about to reach zero.

13. The method of operating the parking meter of claim 11, further comprising: upon initiating the communication session, transmitting a message to a wireless device of the registered user indicating the set time remaining is about to reach zero.

14. The method of operating the parking meter of claim 11, wherein a portion of the communication circuitry that is not deactivated enables the communication circuitry to receive an incoming signal.

15. The method of operating the parking meter of claim 14, further comprising receiving the incoming signal and activating the deactivated portion of the communication circuitry in response to receiving the incoming signal.

16. The method of operating the parking meter of claim 15, further comprising: receiving additional time information from the management system subsequent to receiving the incoming signal, the additional time information indicating that more additional time should be added to the set time; adjusting the display accordingly to reflect the more additional time added to the set time; and resuming the countdown of the set time to zero.

17. The method of operating the parking meter of claim 11, wherein the user identifier is a RFID tag and reading the user identifier comprises using a RFID reader.

18. The method of operating the parking meter of claim 11, further comprising: detecting a presence of a vehicle being present in a parking space associated with the meter device with a sensor, reading identification information from the vehicle present in the parking space with the sensor; receiving the identification information from the sensor, the identification information being linked to the registered user; and transmitting the identification information to the management system with the communication circuitry prior to receiving the time information from the management system.

19. The method of operating the parking meter of claim 18, wherein the sensor comprises an RFID reader, the method further comprising reading the vehicle identification information from a RFID tag coupled to the vehicle.

* * * * *